United States Patent [19]

Osawa et al.

[11] E Patent Number: Re. 33,784

[45] Reissued Date of Patent: Dec. 31, 1991

[54] MAGNETIC RECORDING/REPRODUCING APPARATUS FOR RECORDING ONTO OR REPRODUCING FROM A MAGNETIC TAPE

[75] Inventors: Atsuo Osawa; Kenji Ogiro; Shouzou Yokoo, all of Yokohama; Hidekazu Takeda, Katsuta, all of Japan

[73] Assignee: Hitachi, Ltd., Tokyo, Japan

[21] Appl. No.: 531,084

[22] Filed: May 31, 1990

Related U.S. Patent Documents

Reissue of:

[64] Patent No.: 4,748,521
Issued: May 31, 1988
Appl. No.: 854,031
Filed: Apr. 21, 1986

[30] Foreign Application Priority Data

Apr. 19, 1985 [JP] Japan ..... 60-82434

[51] Int. Cl.[5] ..... G11B 15/61; G11B 15/18
[52] U.S. Cl. ..... 360/85; 360/137
[58] Field of Search ..... 360/85, 96.5, 96.6, 360/137

[56] References Cited

U.S. PATENT DOCUMENTS 4,491,885 1/1985 Morikawa et al. ..... 360/85
4,611,251 9/1986 Yokoo ..... 360/85

FOREIGN PATENT DOCUMENTS 0115075 8/1984 European Pat. Off. .
3406887 2/1984 Fed. Rep. of Germany .
3412527 4/1984 Fed. Rep. of Germany .
57-74859 5/1982 Japan .

*Primary Examiner*—Robert S. Tupper
*Attorney, Agent, or Firm*—Antonelli, Terry, Stout & Kraus

[57] ABSTRACT

A magnetic recording/reproducing apparatus for recording onto or reproducing from a magnetic tape housed in a cassette by using a rotary magnetic head having a tape withdrawal arrangement for winding a portion of the tape between the two reels in the cassette around the rotary magnetic head by a predetermined angle. A tape drive feed the magnetic tape at a constant speed, with a reel drive being provided for driving either one of the two reels so as to take up the magnetic tape in the reel driven by the reel drive, and with brake arrangement for braking the rotation of the reels. A ring-shaped cam operating member is provided in the outer peripheral surface or the inner peripheral surface thereof with cam surfaces each for effecting the operation of the respective elements in response to the mode of operation of the magnetic recording/reproducing apparatus. The selective operation is specifically determined by the rotational position of the ring-shaped cam operating member, and the rotational position is varied in response to the mode of operation. A detector is provided for detecting the rotational positions in the ring-shaped cam operating member.

11 Claims, 9 Drawing Sheets

MAGNETIC RECORDING/REPRODUCING APPARATUS FOR RECORDING ONTO OR REPRODUCING FROM A MAGNETIC TAPE

Matter enclosed in heavy brackets [ ] appears in the original patent but forms no part of this reissue specification; matter printed in italics indicates the additions made by reissue.

BACKGROUND OF THE INVENTION

The present invention relates to a mechanism in a magnetic recording/reproducing apparatus and, more particularly, to a mechanism for switching the mode of operations suitable for use in a magnetic producing/reproducing apparatus such as represented by a video cassette recorder.

In a magnetic recording/reproducing apparatus, it is necessary to switch the mode of various operations such as recording or reproducing mode, fast forward winding mode, etc. In response to the operation of selecting the switching to the desired mode of operation, a mechanism which as a tape withdrawing guide mechanism, a tape driving mechanism or a braking mechanism is actuated, and, U.S. Pat. No. 4,408,236 proposes utilizing a single power source from which the selected mechanism is commonly driven.

In such a proposed driving mechanism for selecting the mode of operations, the driving force is transmitted from a single power source to a selected driven member such as the brake, the driving roller through several members such as sliders and arms. Thus, it is necessary to assemble the respective power transmitting members so that they can be operated in timed relationship to each other in their operational phases, thereby causing difficult problems in assembling the same.

SUMMARY OF THE INVENTION

An object of the present invention is, therefore, to provide a mechanism for switching the mode of operations suitable for use in a magnetic recording/reproducing apparatus which is easy to assemble and accurate in operation, while it can be effectively made compact.

In order to achieve the above object, the present invention is constructed by driven members which are driven in response to the selected mode of operations, a ring-shaped operating cam formed with a plurality of cam portions corresponding to the respective driven members, and driving means driven by a single power source for rotating the ring-shaped operating cam. Position detecting means is provided in the ring-shaped operating cam for detecting the rotational position corresponding to each mode of operation so as to control the rotational position.

In the present invention, means may further be coupled with the above described single power source for commonly driving a tape loading mechanism to form a predetermined feeding passage of a magnetic tape which is withdrawn from a cassette.

According to the characteristic feature of the present invention, since each of the plurality of driven members is driven directly by a single ring-shaped operating cam in response to a selected mode of operation, the relative positioning of the respective driven members with respect to the ring-shaped operating cam is facilitated when the same is assembled. Further, the entire construction can be formed in the circular shape, while it is easy to make the size of the entire apparatus compact, because the plurality driven members can be actuated by the single ring-shaped operating cam.

BRIEF DESCRIPTION OF THE DRAWINGS

FIGS. 10 and 11 show the arrangement of a guide roller on the loading ring with a portion in cross-section, FIG. 10 showing the loading operation in its intermediate state, while FIG. 11 shows the state at the end of the loading operation;

DETAILED DESCRIPTION OF THE PREFERRED EMBODIMENT

An embodiment of the present invention will be described below with reference to the accompanying drawings.

Figure 1:
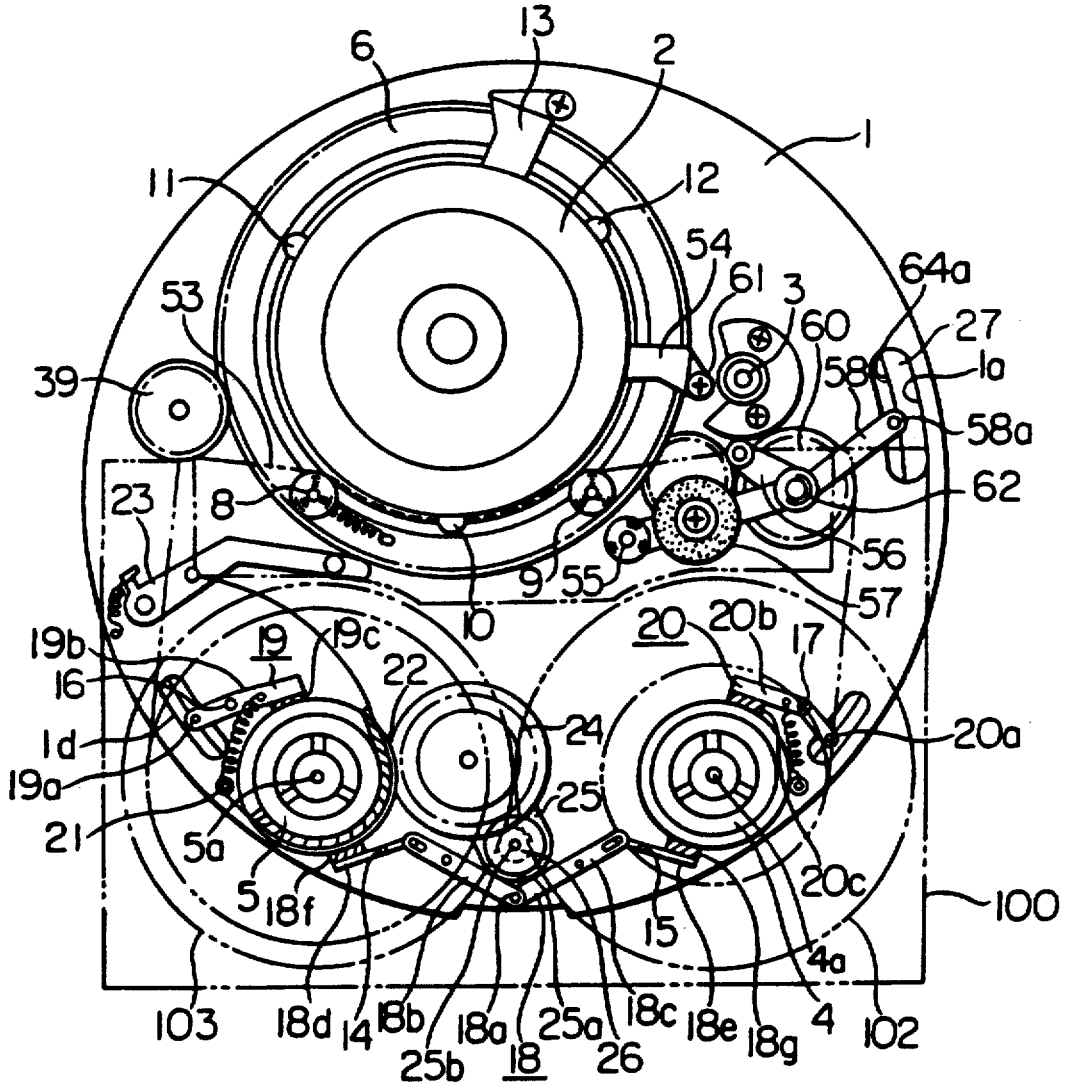
FIG. 1 is a plan view showing the main portions of a first embodiment of a video cassette tape recorder of the present invention.

FIG. 1 shows an embodiment of the mechanism for switching the mode of operations according to the present invention which is applied to a video tape recorder and, in particular, FIG. 1 illustrates the arrangement of various components such as reel supports for engaging with reels of the cassette tape, a rotary head device and a tape driving mechanism.

When the magnetic recording/reproducing apparatus is operated, a cassette 100 housing therein reels 102, 103 with a tape 53 wound thereon is loaded on the apparatus as shown by the two dot chain line in FIG. 1. FIG. 1 shows the apparatus in the standstill position before the tape 53 is withdrawn from the cassette. Main portions such as a cylindrical head drum 2 constituting the rotary head device, a capstan 3 for feeding the tape at a constant speed, reel supports 4, 5 with which the reels 102, 103 engage, respectively, a loading ring 6 and a pinch roller 57 are arranged on a disc-shaped chassis 1 as shown in FIG. 1.

The loading ring 6 is freely rotatably supported on the chassis 1 by three holding rollers 10, 11, 12 adapted to shiftably contact with the inner periphery thereof. Guide rollers 8, 9 are arranged on the loading ring 6 for drawing the tape out of the cassette cartridge and winding the same around the head drum 2 by a predetermined angle. The reel supports 4, 5 are freely rotatably supported on shafts 4-a, 5-a rigidly mounted on the chassis 1, respectively. A main brake 18 and sub-brakes 19, 20 are arranged near the outer periphery each of the reel supports 4, 5 for simultaneously controlling the two reel supports. These brakes are constituted by brake arms 18b–18e, 19b, 20b and brake shoes 18f, 18g, 19c, 20c which are rotatably mounted so as to be rotated about pins 14, 15, 16, 17 rigidly mounted on the chassis, respectively. An arm 25 mounting thereon an idler gear 24 and an intermediate gear 26 is freely rotatably supported between the reel supports 4, 5 so as to be rotated about a shaft 25b. The idler gear 24 is selectively meshed with either one of the reel supports 4, 5 so that the rotational driving force of a capstan motor (refer to FIG. 3) is transmitted to the reel support 4 or 5. A band brake 22 having one end thereof securely engaged with a pin 21 on the chassis is wound around the outer periphery of the supply side reel support 5 by a predetermined angle, and the other end of the band brake 22 is rotatably engaged with a pin on a tension arm 23.

Figure 2:
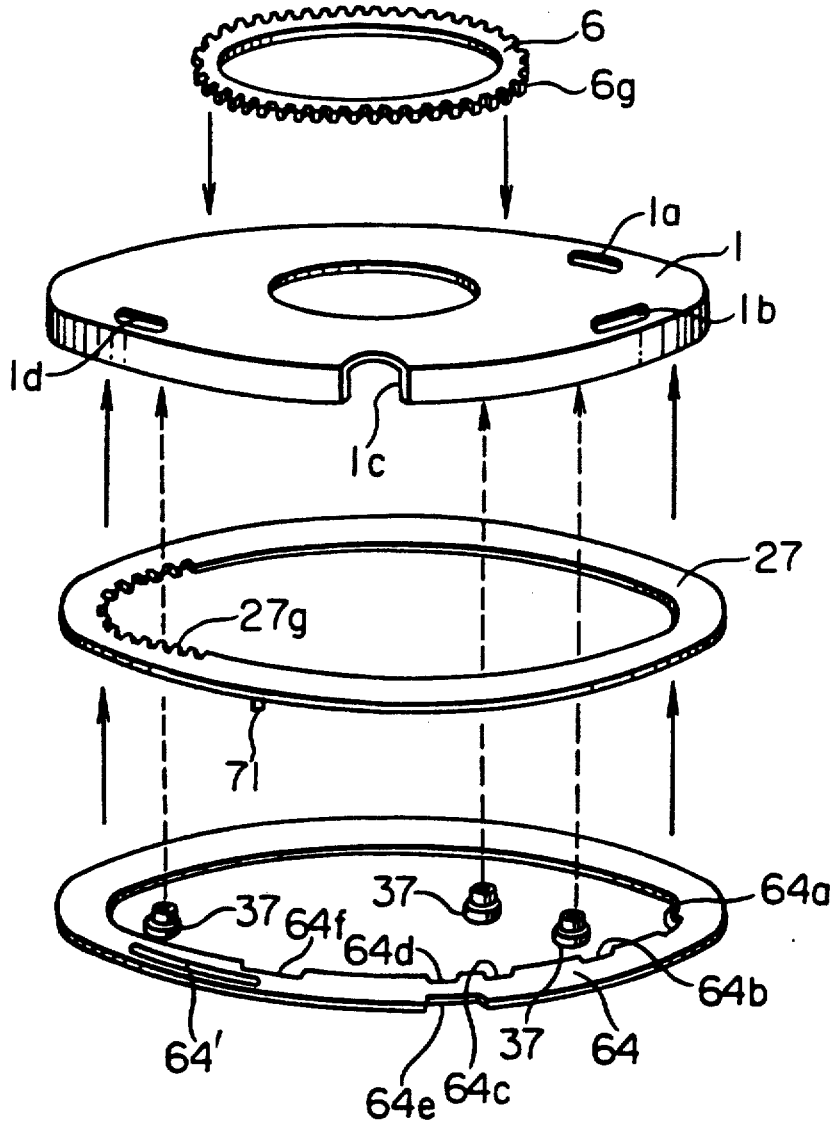
FIG. 2 is an exploded perspective view showing the relative arrangement of a ring-shaped operating cam for switching the mode of operations, a driving ring for driving the same and a loading ring for the tape loading with respect to a chassis of the apparatus for the easy understanding of the arrangement.

FIG. 2 is an exploded perspective view showing the relationship of the mounting of the loading ring 6, a driving ring 27 and an operating ring 64. The loading ring 6 is formed entire outer periphery with gear teeth 6g and is arranged on the upper surface of the chassis 1. The driving ring 27 is formed in an inner peripheral portion thereof with gear teeth 27g, and is supported in contact with the lower surface of the chassis 1. The operating ring 64 is rotatably supported in the chassis 1 by holders 37 at a position further remote from the chassis 1 with respect to the driving ring 27. A plurality of cam surfaces 64a–64f are formed in the inner and outer peripheral surfaces of the operating ring 64 for operating the driven members. A groove 64' of a predetermined length is formed in the operating ring 64, and one end of the groove 64' is adapted to engage with a stationary pin 71 secured to the driving ring 27.

Figure 3:
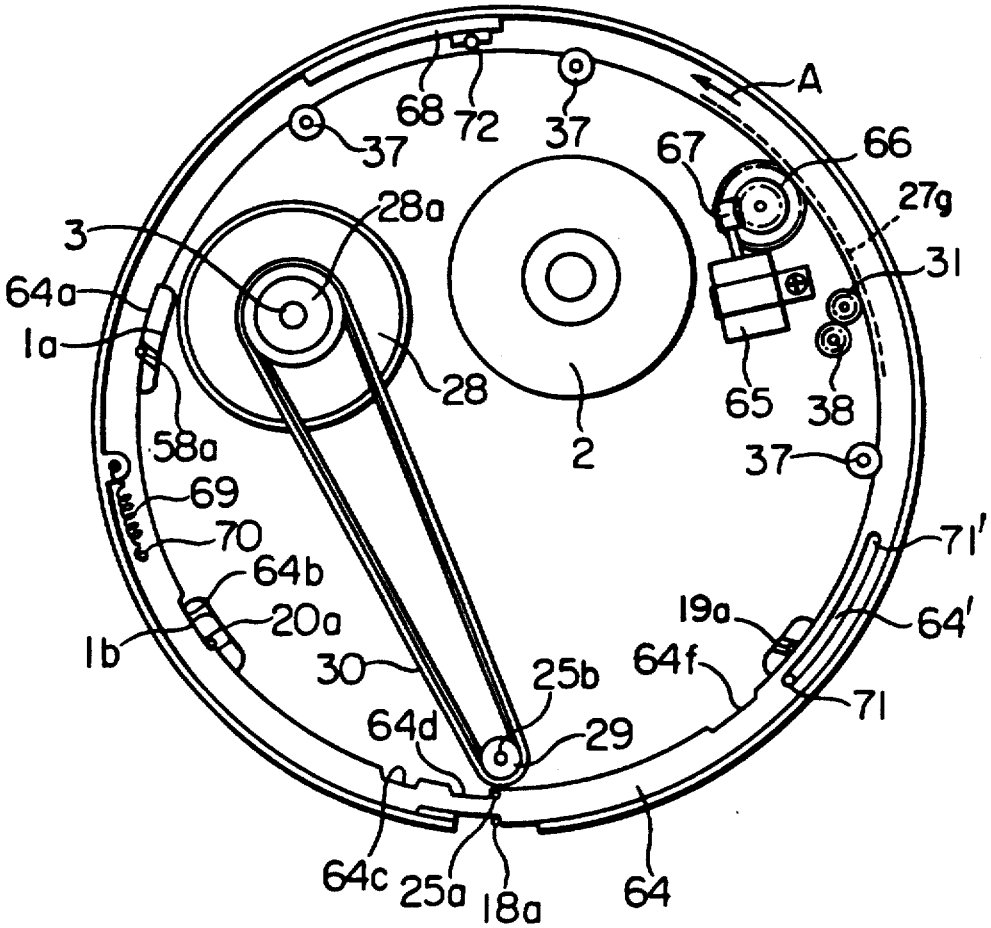
FIG. 3 shows the rear side of the apparatus shown in FIG. 1.

As shown in FIG. 3, the outer peripheral edge of the chassis 1 is formed with a peripheral wall extending in the direction toward the rear side as shown in FIG. 2 so that it provides a guard for the driving ring 27, the operating ring 64 along the entire periphery of the chassis 1. A flywheel 28 secured to an extension of the capstan 3 serves also as a rotor of a direct drive motor of the flat-type for driving the capstan 3. A driving force transmission belt 30 extends around a driving pulley 21a compressively fitted with the capstan 3 coaxilly with the flywheel 28 and an intermediate pulley 29 for transmitting the driving force of the reel supports to the idler gear 24. Power transmission gear 31 and a driving gear 66 mesh with gear teeth 27g formed in the inner periphery of the driving ring 27. Pins 19a, 20a, 58a, and 18a for actuating the sub-brakes 19, 20 arranged on the chassis, a pinch roller arm 58 and the main brake 18, respectively, extend through openings 1a–1d in the chassis to abut against the cam surfaces 64a–64f formed in the inner and outer periphery of the operating ring 64.

Figure 4:
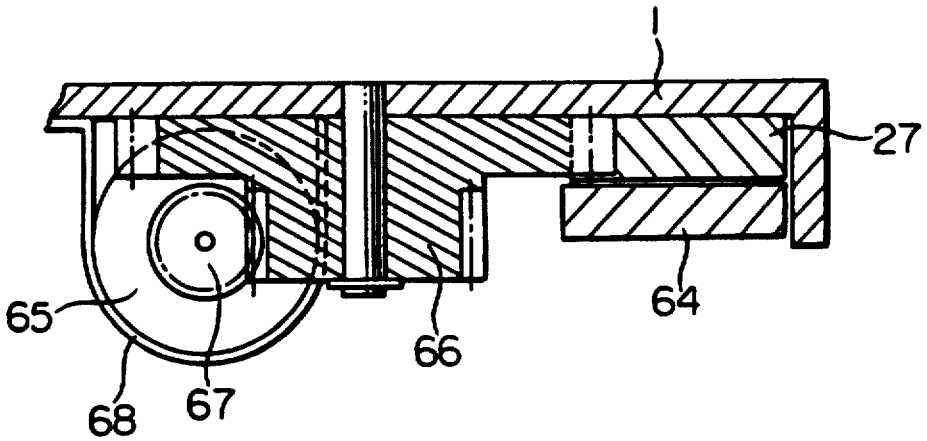
FIG. 4 is a sectional view showing the arrangement of a motor for rotating the driving ring and the driving ring.

FIG. 4 illustrates the positional relationship of the mounting of the driving motor 65, the driving gear 66, the driving ring 27 and the operating ring 64. A worm gear 67 is attached to the tip of the driving shaft of the driving motor 65, and it meshes with one of the two gear portions formed on the driving gear 66, and the other gear portion of the driving gear 66 meshes with gear toothed surface of the driving ring 27. Thus, the driving ring 27 is rotated by the rotation of the driving motor 65 through the driving gear 66.

Figure 5:
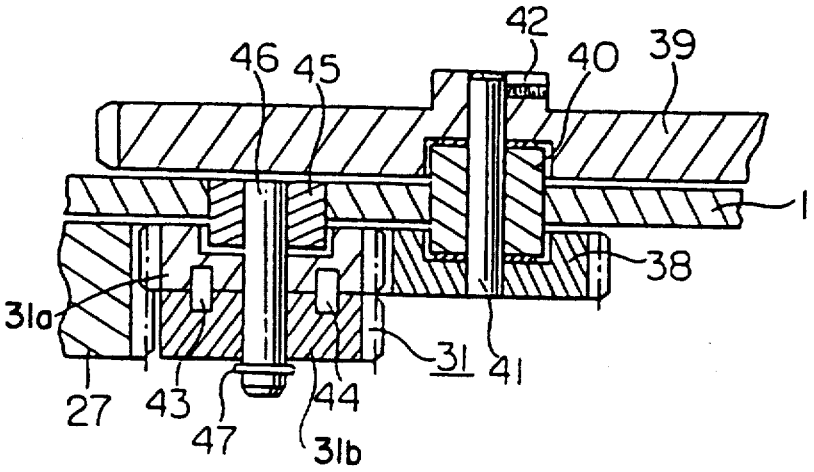
FIG. 5 is a sectional view showing the mechanism of power transmission gears for transmitting the rotation of the driving ring to the loading ring.

FIG. 5 shows a first transmission gear 31, a second transmission gear 38 and a third transmission gear 39 for transmitting the driving force of the driving ring 27 to the loading ring 6. As shown in FIG. 1, the third transmission gear 39 meshes with the loading ring 6 on the upper surface of the chassis 1, and is secured by a set screw 42 to one end of a shaft 41 fitted in a bearing 40 which is in turn secured to the chassis 1. The second transmission gear 38 is compressively fitted with the other end of the shaft 41 and the third transmission gear 39 on the upper surface of the chassis and the second transmission gear 38 on the lower surface of the chassis rotate in synchronism with each other.

Figure 6A:
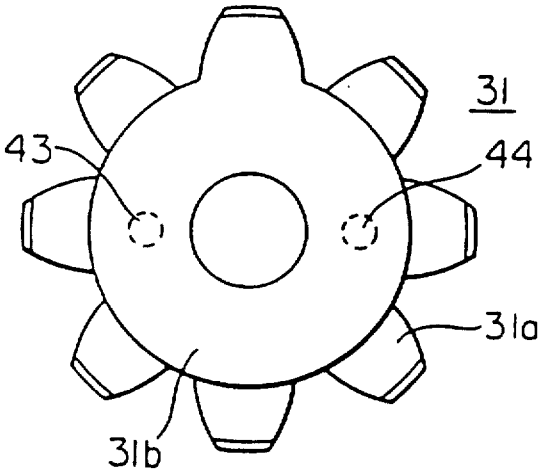
FIGS. 6A and 6B are a plan view and a side view, respectively, showing an example of a power transmission gear.
Figure 6B:
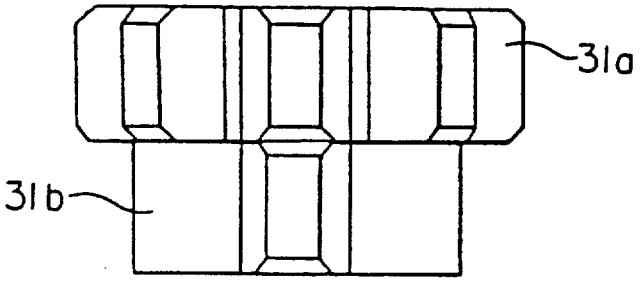

As shown in FIGS. 6A and 6B, the first transmission gear 31 is formed with gear teeth along the entire outer periphery thereof and is constructed as a composite gear wherein a transmission gear 31a meshing with the driving gear 27 and the second transmission gear 38 is integrally secured by pins 43, 44 to a transmission gear 31b having a single tooth on the outer periphery with the remaining outer periphery being formed as a concentrical cylindrical surface of the same diameter as the dedendum circle of the transmission gear 31a. The first transmission gear 31 is rotatably supported by a shaft 46 secured to a boss 45 which is, in turn, secured to the chassis 1. In FIG. 6B, the single tooth of the transmission gear 31b located at the lower position is aligned with one of the teeth of the upper transmission gear 31a.

Figure 7:
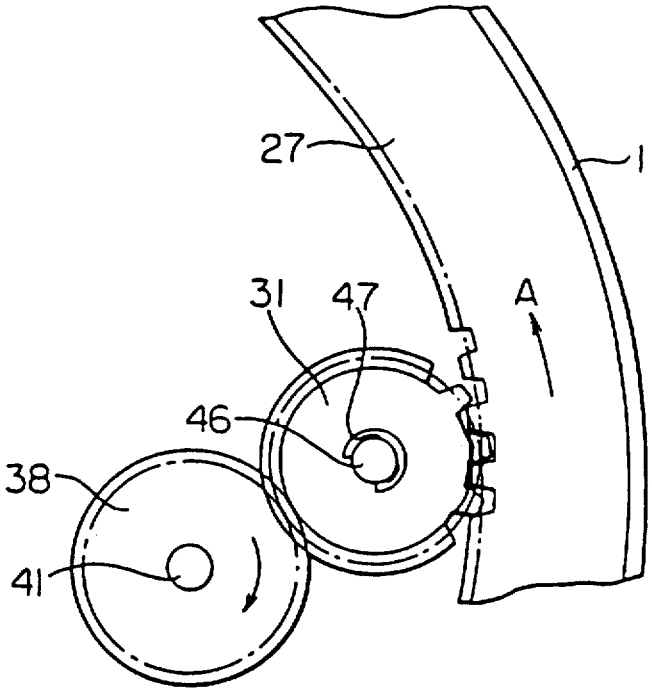
FIG. 7 is a fragmentary plan view showing the mechanism of the driving ring and the power transmission gears.
Figure 8:
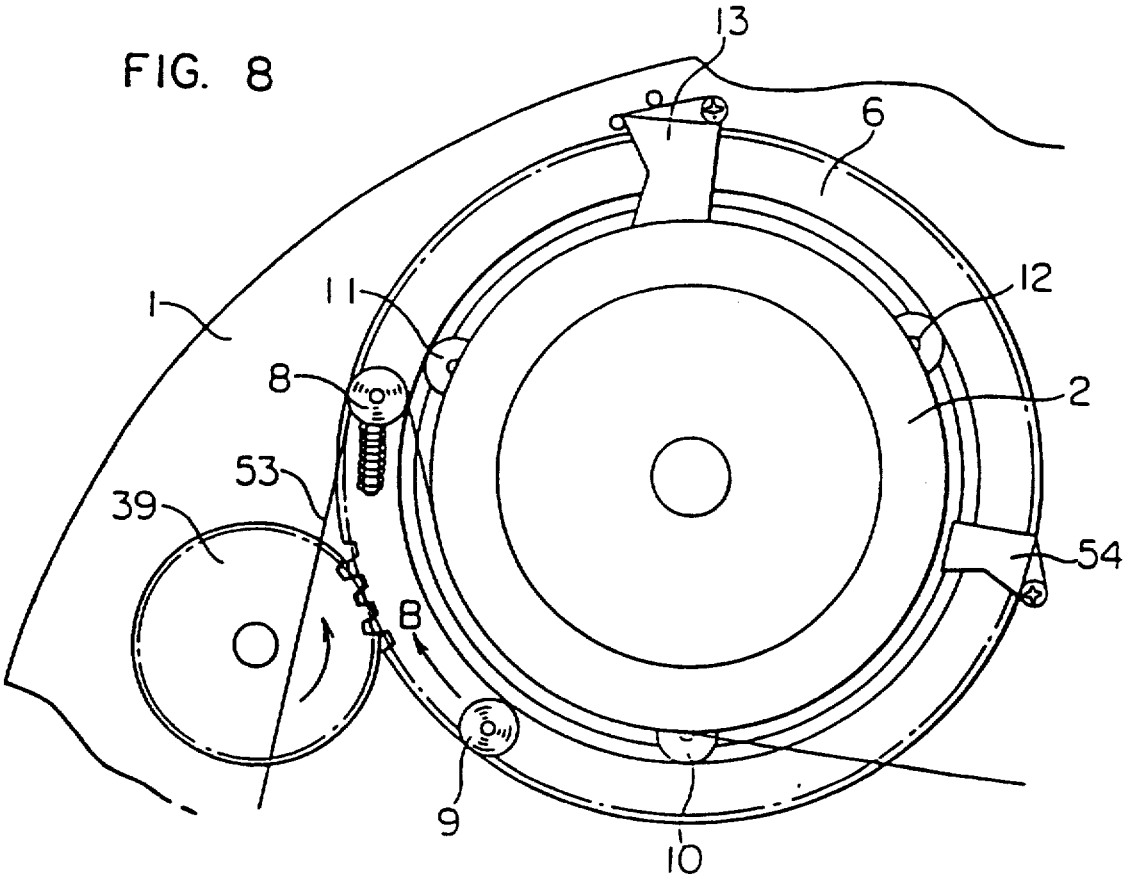
FIG. 8 is a fragmentary plan view showing the loading ring and the rotary head device.

As shown in FIG. 7, the rotation of the driving ring 27 in the direction of the arrow A is transmitted to the loading ring 6 by the above described transmitting mechanism and it is converted into the rotation in the direction of the arrow B shown in FIG. 8. As shown in FIG. 8, the guide roller 8 on the loading ring 6 at the inlet side serves to wind the magnetic tape 53 around the inlet side of the head drum 2. A central shaft of the guide roller 9 is secured to the upper surface of the loading ring 6 so that the guide roller 9 acts as a tape guide at the inlet side of the head drum 2.

Figure 9A:
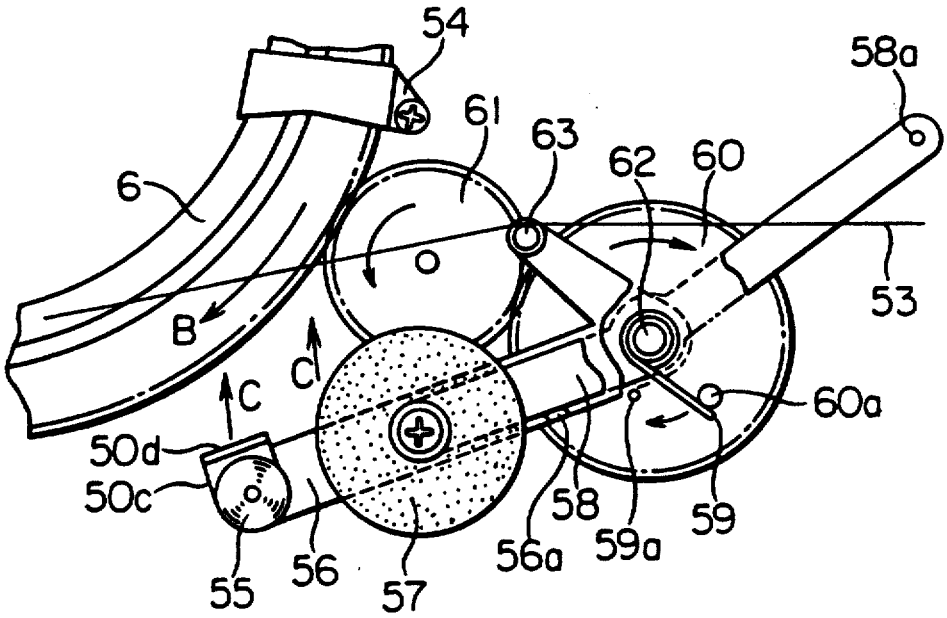
FIGS. 9A and 9B are a plan view and a side view, respectively, showing the mechanism of a moving tape guide and a pinch roller lever portion.
Figure 9B:
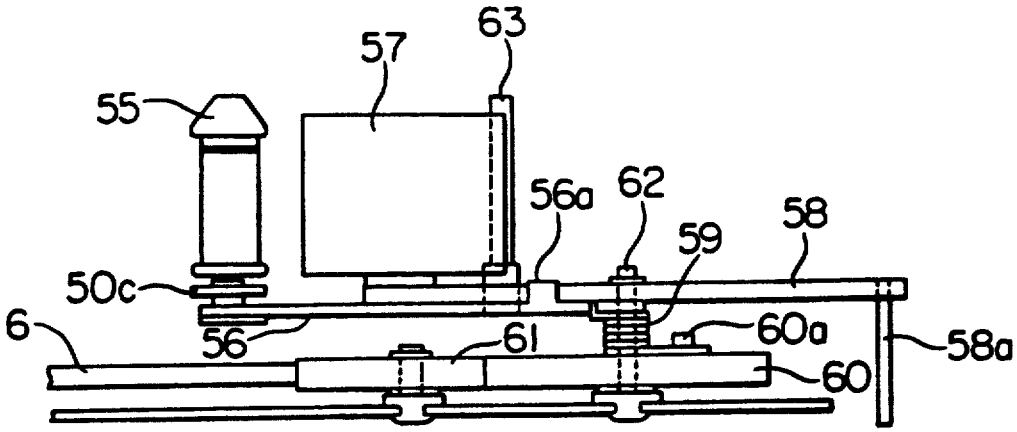

FIGS. 9A and 9B show the relationship of the driving system for the loading ring 6 and the pinch roller 57. In FIG. 9A, a portion of each of a guide arm 56 and a pinch roller arm 58 is shown as being broken away so as to show the arrangement of the parts beneath the broken-away portions. As shown in FIG. 9A the loading ring 6 is rotated in the direction of the arrow B, with the rotation being converted into the rotation of each of the intermediate gear 61 and the arm operating gear 60 in the directions as shown by the arrows in the figure, respectively. An arm operating pin 60a on the gear 60 urges a torsion spring 59 in the direction shown by the arrow FIG. 9A. In this case, the resilient force of the torsion spring 59 caused by the distorsion thereof acts to urge the guide arm 56 in the direction of the arrow C through one end 59a of the torsion spring 59. By virtue of this urging action, the guide arm 56 and a guide roller 55 and a winding pin 63 mounted on the guide arm 56 are rotated in the direction of the arrow C.

A projection 56d provided on the edge portion of the guide arm 56 acts to rotate the pinch roller arm 58 by the rotation of the guide arm 56 simultaneously therewith in the direction of the arrow C, so that the pinch roller 57 freely rotatably supported on the pinch roller arm 58 is also rotated in the direction of the arrow C.

By the operation of the apparatus as described above, the tape 53 is wound onto the head drum 2 at the outlet side. The movement each of the above described guide rollers 8, 9 and 55 continues until the guide rollers 8 and 55 reach catchers 13 and 54 shown in FIGS. 8 and 9A, respectively.

Figure 10:
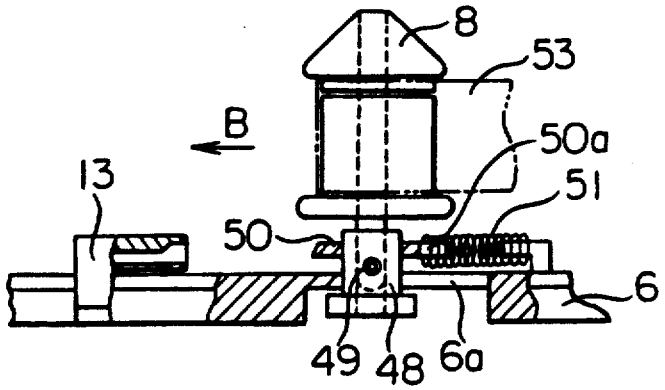

FIG. 10 is a sectional view showing the positional relationship between the inlet side guide roller 8 and the loading ring 6 during the movement thereof. The lower end of the central shaft of the guide roller 8 is formed with a threaded portion which is threadedly engaged with the threaded portion formed in a hole of a boss 48 is slidably engaged in an elongated hole 6-a formed in the loading ring 6. The securing of the guide roller 8 to the boss 48 is effected by a set screw 49 provided at the side of the boss 48. A flange is formed at the lower portion of the boss 48 thereby forming removal preventing means for the boss 48 from being moved out of the elongated hole 6a. A positioning plate 50 is press fitted onto the outer peripheral surface of the boss 48.

Figure 13:
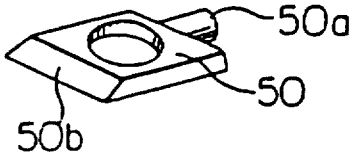
FIG. 13 shows a receiving plate secured to the guide roller engaging with the catcher.

FIG. 13 is a perspective view schematically showing the configuration of the positioning plate 50. A pin 50a is provided at the rear portion of the positioning plate 50. The pin 50-a is adapted to receive a compression spring 51 as shown in FIG. 10 and it is coupled with a projection on the loading ring 6.

Figure 11:
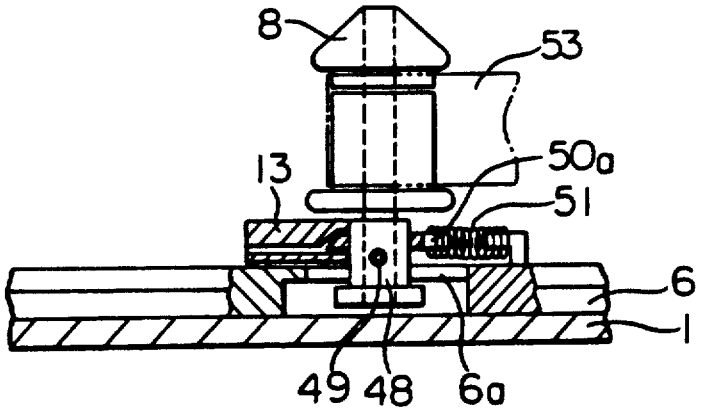

FIG. 11 shows the state of the guide roller 8 shown in FIG. 10 wherein it is moved to cause its boss 48 to abut a catcher 13.

Figure 12:
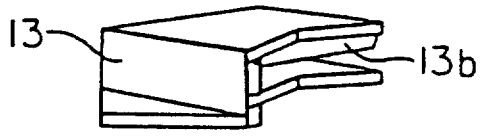
FIG. 12 shows an example of the construction of a catcher of the guide roller.

FIG. 12 is a perspective view showing the construction of the catcher 13. V-shaped bearing surfaces are formed at the upper and lower side portions of the catcher 13, respectively, which engage with the cylindrical portion of the boss 48 so as to position the guide roller 8 on the plane of the chassis. An inclined surface 13b having a predetermined inclination angle with respect to the direction of advance of the loading ring 6 is formed at the lower side of the upper bearing surface of the catcher 13 and is adapted to compressingly engage with an inclined surface 50b formed in the front side of the positioning plate 50.

With the construction described above, a predetermined compressing force is generated between the boss 48 of the guide roller 8 and the V-shaped positioning surfaces of the catcher 13 by virtue of the fact that the compression spring 51 is compressed by a predetermined amount after the guide roller 8 commences contact with the catcher 13. The above described construction of the compressingly contacting portions may be applied to the case of the guide roller 55 at the outlet side and another catcher 54. In other words, another positioning plate 50c having an inclined surface 50d at the front side thereof is provided at the lower side of the guide roller 55 above the guide arm 56 as shown in FIGS. 9A, 9B. In this case, however, the outlet side guide roller 55 is compressingly contacted with the catcher 54 by the resilient compressing force of the torsion spring 59 instead of the compression spring 51.

The timed relationship between the compressing contacts of the guide rollers 8, 55 with the respective catchers 13, 54 is set to be synchronized with each other by adjusting the operating phases of the loading ring 6 and the meshing of the intermittent gear 61 with the arm operating gear 60. The operation of the driving ring 27 when these guide rollers 8, 55 are compressingly contacted with the respective catchers by the predetermined forces, respectively, will be described below.

Figure 14:
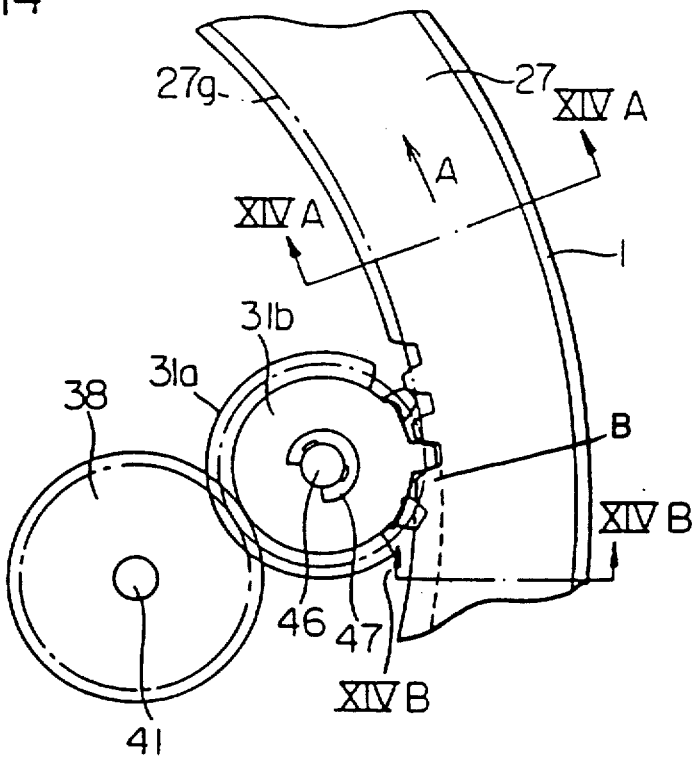
FIG. 14 is a fragmentary plan view showing the state of the driving ring and the power transmission gear immediately before the termination of the loading operation thereof.
Figure 14A:
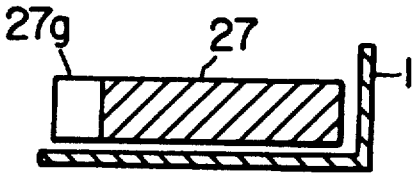
FIGS. 14A and 14B are sectional views taken along the lines XIVA—XIVA and VXB—VXB in FIG. 14, respectively.
Figure 14B:
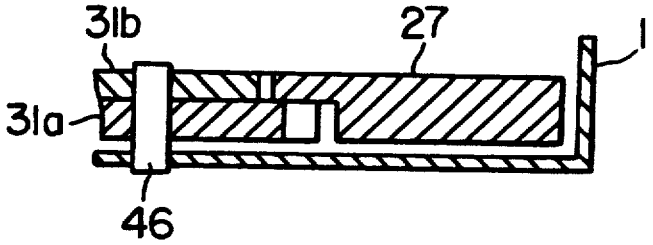

FIG. 14 shows the positional relationship between the driving ring 27 and the first transmission gear 31 at the time point when the amount of compression of the compression spring 51 reaches a predetermined amount. The half of the thickness of the inner periphery of the driving ring 27 adjacent the chassis 1 is relieved from the toothed surface of the transmission gear 31a, as shown in FIG. 14B. This relieved portion begins at an end B of the toothed portion 27g and extends circumferentially away therefrom, so that no meshing engagement will take place between the relieved portions and gear 31a. Thus, only the single tooth surface of the transmission gear 31b will mesh with the last gear tooth of the toothed surface of the driving ring 27. When the driving ring 27 is further rotated in the direction of the arrow A beyond the above described state of the meshing engagement, the single tooth of the gear 31b is forcibly engaged with that part of the inner peripheral surface of the driving ring 27 which is adjacent to the end B of the toothed surface of the driving ring 27. Thereafter, no further transmission of the torque takes place from the driving ring 27 to the gear 31. The timing of this pushed-in position is set to be synchronized with the timing at which the predetermined compressing contact force is generated between the guide rollers 8, 55 and the catchers 13 and 54 by adjusting the relationship between the operational phases of the gears.

As described above, the pin 71 secured onto the driving ring 27 will move in the groove 64' in the operating ring 64 in the direction of the arrow A shown in FIG. 3 by virtue of the fact that the driving ring 27 is driven in the direction of the arrow A in FIG. 3 during the actuation of the loading ring. During the time when the pin 71 is moving, the operating ring 64 is maintained in its standstill state by the tension of a tension spring 69. When the operation of the loading ring terminates, the pin 71 on the driving ring 27 reaches the point 71' at the end of the groove 64' of the operating ring 64. When the driving ring 27 is further rotated in the direction of the arrow A beyond the condition of completion of the loading operation described above, the operating ring 64 is rotated in the direction of the arrow A by means of the pin 71 against the action of the tension spring 69. By the above described rotation of the operating ring 64, the cam surfaces 64a–64f are moved so that the apparatus can be operated in response to the selected mode of operation thereof.

In FIG. 3, a slide switch 68 is secured to the interior of the outer peripheral edge of the chassis 1, and the actuating portion of the switch 68 engages with a pin 72 provided on the operating ring 64 so that the mode of operation is detected according to the respective rotational angle of the operating ring 64. The cam surfaces 64a–64f formed independently from each other in the inner and outer peripheral surfaces of the operating ring 64 rotate also in response to the actuation of the driving ring 27. Thus, these cam surfaces will selectively urge the operating pins 18a, 19a, 20a, 58a, 25a of the main brake 18, the subbrakes 19, 20 the pinch roller lever 58 and the idler arm 25, respectively, which abut against these cam surfaces through the openings 1a–1d, respectively, so that these driven members are rendered to be operated in the well known manner in response to the selected mode of operation. This is achieved by virtue of the provision of the cam surfaces 64a–64f which are configured so as to correspond to the modes of operations detected by the above described slide switch 68. Further various operations such as the recording/reproducing, the fast feeding and the rewinding are effected by electrically controlling the head drum 2, the capstan 3 for selectively rotating them in response to the mode of operation detected by the slide switch 68.

What is claimed is:

1. A magnetic recording/reproducing apparatus including:

a plurality of reel supports for supporting reels of a cassette with a tape-shaped recording medium wound on said reels;

a magnetic rotary head;

means for withdrawing said tape-shaped recording medium out of said cassette, winding the withdrawn recording medium on said magnetic rotary head and guiding said recording medium along a predetermined tape feeding path;

a capstan;

a pinch roller movable from an inoperative position to an operative position to cooperate with said capstan to pinch said recording medium therebetween when said recording medium is in a first running condition;

reel driving means including an idler gear movable from an inoperative position to an operative position to drive one of said reel supports when said recording medium is in a second running condition;

reel support braking means including brake shoes movable from an inoperative position to an operative position to brake rotations of said reel supports when said recording medium is in a third running condition;

operating members independently provided for said pinch roller, for said idler gear, and for said brake shoes for moving said pinch roller, said idler gear and said brake shoes between said operative positions and said inoperative positions, respectively, said operating members being respectively provided with cam followers;

a ring-shaped cam member having cam surfaces formed on radially inner and outer peripheries thereof, said cam followers being respectively operatively associated with said cam surfaces of said ring-shaped cam member so that when said ring-shaped cam member is rotated, said cam followers are respectively actuated by said cam surfaces whereby said pinch roller, said idler gear and said brake shoes are respectively moved from one of said two positions to the other[.]*;*

*driving means including a single motor means for driving said tape withdrawing means and said ring-shaped cam member; and power transmission means for transmitting the torque of said motor means to said tape withdrawing means and said ring-shaped cam member intermittently in a timed relationship with the movements of said operating members, said power transmission means including a driving ring disposed in a superposed relationship with said ring-shaped cam member and having a rack formed along a part of at least one of inner and outer peripheral surfaces of said driving ring.*

[2. A magnetic recording/reproducing apparatus according to claim 1, further comprising driving means including a single motor means for driving said tape withdrawing means and said ring-shaped cam member, and power transmission means for transmitting the torque of said motor to said tape withdrawing means and to said third ring-shaped cam member intermittently in a timed relationship with the movements of said operating members.]

3. A magnetic recording/reproducing apparatus according to claim 1, further including a substantially circular chassis having a diameter substantially the same as a diameter of said ring-shaped cam member and carrying thereon all elements of the magnetic recording and reproducing apparatus.

4. A magnetic recording/reproducing apparatus according to claim [2] *1*, wherein said power transmission means *further* includes a [driving ring disposed in a superposed relationship with said ring-shaped cam member and has a rack formed along a part of one of an inner and outer peripheral surface of said driving ring;] reduction gear means drivingly connected to said single motor means and including a second gear disposed in meshing engagement with said rack to transmit a torque of said motor to said driving ring; transmission gear means drivingly connected to said tape withdrawing means and including a third gear engageable with said rack to transmit the torque of said driving ring to said tape withdrawing means during a time period when said third gear is engaged with said rack; an elongated hole formed in one of said ring-shaped cam member and said driving ring; and a pin means mounted on the other of said ring-shaped cam member and said driving ring and adapted to be received in said elongated hole to transmit the torque of said driving ring to said ring-shaped cam member during a time period when said pin means is engaged with an end of said elongated hole.

5. A magnetic recording/reproducing apparatus according to claim 3, further including means for detecting a rotational position of said ring-shaped cam member relative to said chassis.

6. A magnetic recording/reproducing apparatus according to claim 5, wherein said detecting means includes a pin mounted on one of said ring-shaped cam member and said chassis and a slide switch disposed in sliding engagement with said pin and mounted on the other of said ring-shaped cam member and said chassis.

*7. A magnetic recording/reproducing apparatus including:*

*reel driving means for rotatably driving reels in a cassette accommodating a tape-shaped recording medium wound on said reels;*

*tape driving means for feeding said tape-shaped recording medium;*

*reel braking means for braking said reels;*

*rotary cylinder means having magnetic head means;*

*means for drawing out said tape-shaped recording medium from said cassette, winding the drawn out tape-shaped recording medium on said rotary cylinder means and guiding the drawn out tape-shaped recording medium along a predetermined path;*

*operating means operatively associated with at least one of said tape driving means, said reel driving means and said reel braking means to switch said at least one of said tape driving means, said reel driving means and said reel braking means from one of operative and inoperative positions to the other;*

*driving motor means;*

*driving gear means driven by said driving motor means and including a driving gear;*

*means for transmitting torque of said driving gear to said drawing-out means and to said operating means;*

*said torque transmitting means including an arcuate rack engaged with said driving gear, cam means and a driven gear engageable with said rack;*

*wherein said arcuate rack and said cam means are rotatable by said driving gear about a common axis of rotation, said cam means are operatively associated with said operating means to actuate said operating means when said cam means are rotated by said driving gear about said common axis of rotation, and said driven gear is spaced from said driving gear in a rotational direction of said arcuate rack and operatively connected to said means for drawing out to transmit the torque of said driving gear to said means for drawing out.*

*8. A magnetic recording/reproducing apparatus according to claim 7, wherein said torque transmitting means further include a ring-shaped cam member having peripheral surfaces, said cam means comprising cam surfaces formed in at least one of the peripheral surfaces of said ring-shaped cam member, a ring-shaped transmission member concentric to said ring-shaped cam member and having a substantially circular periphery formed thereon with said arcuate rack, and means for drivingly connecting said ring-shaped transmission member to said ring-shaped cam member.*

*9. A magnetic recording/reproducing apparatus according to claim 8, wherein said means for drivingly connecting comprises a lost-motion connection.*

*10. A magnetic recording/reproducing apparatus according to claim 8, wherein said ring-shaped transmission member has a cylindrical surface following said rack as viewed in a circumferential direction of said ring-shaped transmission member, and wherein said torque transmitting means further includes means fixed to said driven gear so as to be engageable with said cylindrical surface after said driven gear has been rotated in one direction by said ring-shaped transmission member, to prevent said driven gear from being rotated in an opposite direction.*

*11. A magnetic recording/reproducing apparatus according to claim 8, further including a circular chassis having a diameter substantially the same as a diameter of said ring-shaped cam member and accommodating the same and said ring-shaped transmission member therein.*

*12. A magnetic recording/reproducing apparatus according to claim 8, wherein said cam surfaces are spaced from each other in the rotational direction thereof and wherein said operating means comprise a plurality of independent operating members operatively associated with said tape driving means, said reel driving means and said reel braking means to switch said tape driving means, said reel driving means and said reel braking means from one of operative and inoperative positions to the other, respectively.*

* * * * *